United States Patent [19]

Williams

[11] Patent Number: 4,638,172

[45] Date of Patent: Jan. 20, 1987

[54] COMBINATION, A MODEL VEHICLE ENGINE AND A DIRECT-CURRENT GENERATOR

[76] Inventor: George A. Williams, 16 Grant St., Dover, N.J. 07801

[21] Appl. No.: 675,227

[22] Filed: Nov. 27, 1984

[51] Int. Cl.⁴ .............................................. H02K 7/18
[52] U.S. Cl. ............................... 290/1 R; 310/40 MM
[58] Field of Search ..................... 290/1 R, 1 A, 1 B; 310/40 MM, 66, 67 R

[56] References Cited

U.S. PATENT DOCUMENTS

| | | | |
|---|---|---|---|
| 2,453,636 | 11/1948 | McKay ............................... | 290/1 A |
| 2,483,305 | 9/1949 | Vollenweider ..................... | 290/1 A |
| 2,532,700 | 12/1950 | Eurich et al. ................. | 310/40 MM |
| 3,270,220 | 8/1966 | Isaacson ........................ | 310/40 MM |
| 4,115,713 | 9/1978 | Da Costa et al. ......... | 310/40 MM X |
| 4,152,614 | 5/1979 | Noguchi et al. .......... | 310/40 MM X |

*Primary Examiner*—William M. Shoop, Jr.
*Assistant Examiner*—W. E. Duncanson, Jr.
*Attorney, Agent, or Firm*—Bernard J. Murphy

[57] ABSTRACT

The Engine-Generator combination comprises a small internal-combustion engine, such as is used to power model vehicles, such as model airplanes, and a direct-current generator operatively coupled to the engine. The generator produces from four volts and one hundred and fifty milliamperes of current to one hundred volts and a current in excess of two hundred and fifty milliamperes, upon the engine being run at speeds of from three thousand revolutions per minute to twenty thousand revolutions per minute, where the generator has from six hundred turns of #36 gauge magnetic wire on each of the three poles thereof, to one thousand turns of #40 gauge magnetic wire on each of the three poles. The generator, driven by the engine provides its direct-current power to charge nicade batteries carried by, and used by a model vehicle in which the engine-generator is installed.

15 Claims, 2 Drawing Figures

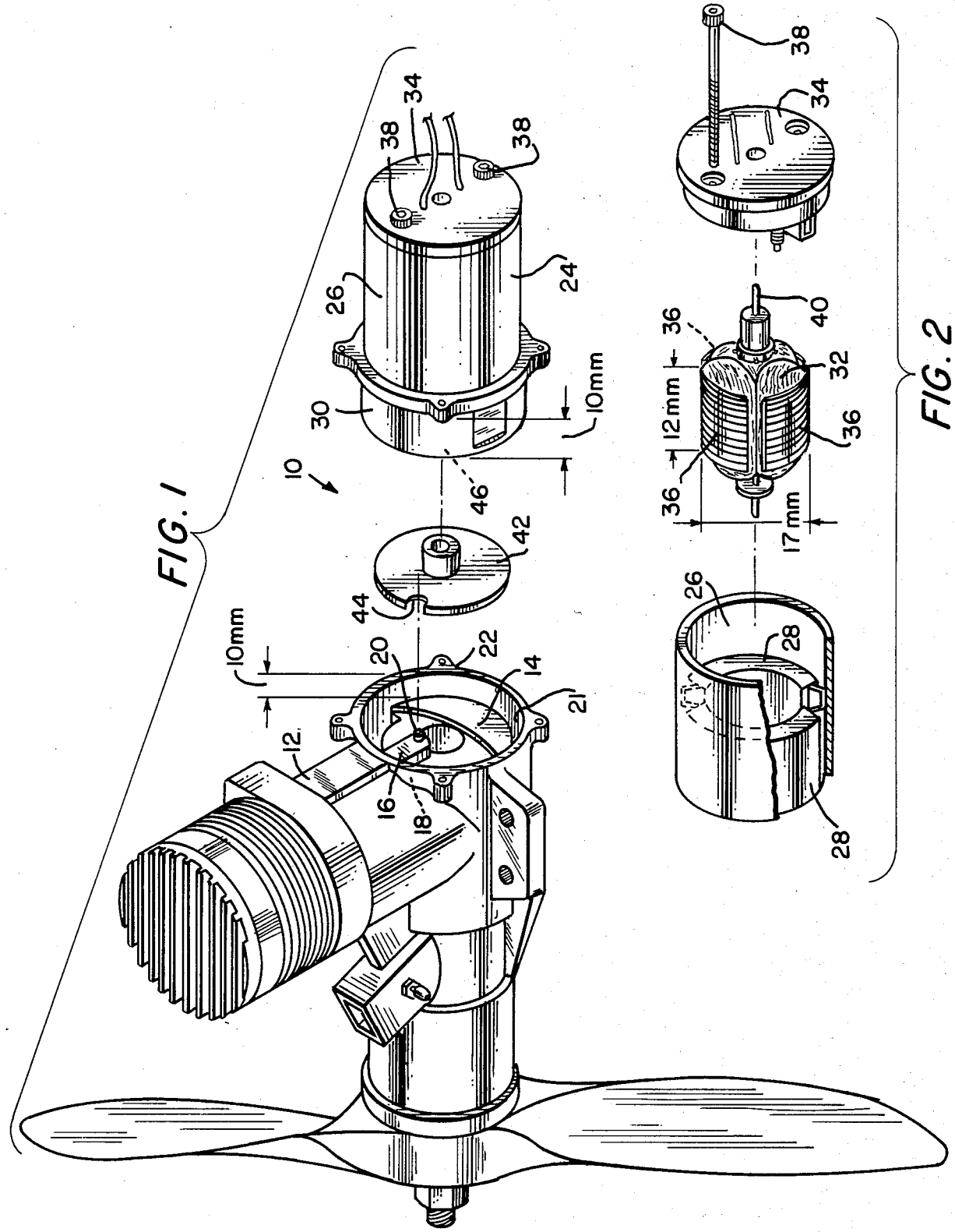

COMBINATION, A MODEL VEHICLE ENGINE AND A DIRECT-CURRENT GENERATOR

This invention pertains to power plants or prime movers for model vehicles, such as model airplanes or the like, and in particular to a novel combination of a model vehicle engine and a direct-current generator.

Model vehicles, to wit: model airplanes, for example, especially of current designs, have needs for sustained electrical power. The latter is needed for the radio control thereof, to operate control surfaces, to illuminate lights, etc. Accordingly, such accommodate packs of batteries, commonly nicad batteries, to provide all the necessary power. Unfortunately, all the while that the vehicle is in powered motion, the batteries are being drained of their power. There is no known way to provide a means of charging the batteries, during the flight of a model airplane, for instance, as generators small enough and powerful enough to be accommodated in model airplanes, or the like, are unavailable.

In view of the foregoing, there has been a long-felt need for a small but powerful and efficient direct-current generator sufficiently diminutive and light enough to be accommodated in a model vehicle, such as a model airplane. It is an object of this invention, then, to provide just such a generator.

Particularly, it is an object of this invention to set forth, in combination, an engine for a model vehicle, such as a model airplane or the like, and a direct-current generator, comprising an internal-combustion engine; and a direct-current generator operatively coupled to said engine; wherein said generator comprises an armature, and a drive coupling member drivingly engaged with said armature; said armature has three poles; each of said poles has not less than approximately six hundred turns of magnetic wire; said engine having first means comprising a crankshaft, and second means comprising a connecting rod; and one of said first and second means has means for drivingly engaging said drive coupling for imparting rotation to said generator from said engine.

Further objects of this invention, as well as the novel features thereof, will become more apparent by reference to the following description taken in conjunction with the accompanying figures, the latter being a perspective, exploded view of an embodiment of the invention, in FIG. 1, and a perspective, exploded view of the direct-current generator in FIG. 2.

As shown in the figures the novel combination 10 comprises a model aircraft, internal-combustion engine 12. The latter, in this embodiment thereof, comprises a Fox 36X engine, manufactured by Fox Manufacturing Company of Fort Smith, Ark. The engine 12 has a counterweight 14 which, with a connecting rod 16, is coupled to a crankshaft 18. The crankshaft 18 has a stub 20 which projects outwardly from the connecting rod. The engine has a crankcase 21 which opens onto a mounting flange 22, the open end of the crankcase defines an open void having a depth of approximately ten millimeters.

The direct-current generator 24 comprises a housing 26 in which are fixed two arcuate magnetic pieces 28, a flanged annulus 30, an armature 32, and an end piece 34 which carries thereon spring-loaded brushes (not shown). The armature is rotatably journalled in the annulus 30, and comprises three wire-wound poles 36. The armature 32 has a diameter, in this embodiment, of seventeen millimeters, and the poles 36 have a length of twelve millimeters. In this preferred embodiment of my invention, each of the poles 36 is wound with six hundred turns of number thirty-six gauge (#36) magnetic wire. Through bolts 38 passed through the end piece 34 engage and secure the flanged annulus 30 to the housing 26.

One end of the armature 32, by means of the central shaft 40 thereof, frictionally receives a disc 42 fast thereon. In the outer periphery of the disc 42 there is formed an arcuate relief 44, and the latter nestably and slidably engages the stub 20 of the crankshaft. The disc 42 disposes in the outermost portion of the annulus. Accordingly, the annulus 30 has its circular land portion 46 received within the crankcase 21. Such insertion of land portion 46 into the crankcase 21 allows the stub 20 and relief 44 to engage, the mounting flanges of the engine and the annulus to be fastened together, but more importantly, the intrusion of the land portion into the crankcase stuffs the crankcase—to increase the pressure therewithin and to enhance the fuel efficiency. The land portion has a length of approximately ten millimeters which substantially fills the aforesaid crankcase void. In the course of reducing my invention to an actual conception, I constructed two embodiments thereof. An original proto-type comprised an armature, such as armature 32, with three poles like poles 36, in which each pole was wound with one thousand turns of number forty gauge (#40) magnetic wire. At an engine speed of three thousand revolutions per minute, and with the armature under no loading, my novel generator had an output of twenty-one volts and a current of one hundred and fifty milliamperes. At approximately twenty thousand revolutions per minute, the generator provided one hundred volts and a current of more than two hundred and fifty milliamperes. The current maximum could not be directly measured, as the test equipment which I had could only read to a two hundred and fifty milliampere limit. Under an engine speed of three thousand revolutions per minute, I applied a load of from eight to twelve milliamperes to the generator; I did this by connecting the generator to a nine-volt nicad battery. In this loaded condition, the voltage output fell to seven and a half volts, and the current dropped to one hundred and fifty milliamperes. This was more than sufficient for charging nicad batteries.

Next I wound another three-pole armature with number thirty-six gauge (#36) magnetic wire; I would six hundred turns about each pole. The generator with this armature, driven by the model airplane engine, at three thousand revolutions a minute, provided a six volt output at two hundred and fifty milliamperes of current. This was under a no-load condition. Then I added the same nine-volt nicad battery load, and the voltage drop off was about one and a half to two volts, and the current generated was one hundred and fifty milliamperes.

As will be appreciated, my constructions were most painstaking and time-consuming. Even so, I have taught that it is possible to provide an efficient direct-current generator sufficiently diminutive and light enough to be carried in a model airplane, for instance, to charge the nicad batteries therein. In the usual case a model aircraft engine runs at about eight to ten thousand revolutions per minute in normal operation. Accordingly, my combination engine-generator would provide enough output to keep the batteries constantly charged. While I have described my invention in connection with a specific embodiment thereof, it is to be clearly understood that this is done only by way of example, and not as a limitation to the scope of my invention as set forth in the objects thereof and in the appended claims.

I claim:

1. In combination, an engine for a model vehicle, such as a model airplane or the like, and a direct-current generator, comprising:
    an internal-combustion engine; and
    a direct-current generator operatively coupled to said engine; wherein
    said generator comprises an armature, and a drive coupling member drivingly engaged with said armature;
    said armature has three poles;
    each of said poles has not less than six hundred turns of magnetic wire;
    said engine having first means comprising a crankshaft, and second means comprising a connecting rod; and
    one of said first and second means has means for drivingly engaging said drive coupling for imparting rotation to said generator from said engine.

2. The combination of claim 1, wherein:
    said generator has a housing which comprises a mounting flange, and an annulus projecting from said flange;
    said engine has a crankcase which opens onto a mounting flange;
    said flanges being of complementary configuration and having aligned fastener holes for fixing said flanges fast together; and
    said annulus intrudes into said crankcase to define thereof a stuffer which enhances crankcase pressure and fuel efficiency.

3. The combination of claim 2, wherein:
    said coupling member is disposed within the outermost portion of said annulus.

4. The combination of claim 3, wherein:
    said coupling member comprises a disc;
    said disc having a relief formed therein outward of the center thereof;
    said crankshaft has a stub projecting therefrom toward said mounting flange of said crankcase; and
    said stub and said relief are mutually and slidably engaged.

5. The combination of claim 1, wherein:
    said turns of wire are formed from wire of from number forty (#40) to number thirty-six (#36) gauge wire.

6. The combination of claim 1, wherein:
    said armature has a maximum diameter of not more than seventeen millimeters.

7. The combination of claim 1, wherein:
    each of said poles of said armature has a length of not more than twelve millimeters.

8. The combination of claim 1, wherein:
    said engine has a speed of from three thousand to twenty thousand revolutions per minute, and said generator provides an electrical output of from twenty-one volts to one hundred volts, and approximately one hundred and fifty milliamperes to in excess of two hundred and fifty milliamperes of current.

9. The combination of claim 1, wherein:
    said generator, under a loading of from eight to twelve milliamperes, provides an electrical output of not less than seven and a half volts and one hundred and fifty milliamperes of current.

10. The combination of claim 1, wherein:
    said generator, under a loading of from eight to twelve milliamperes, provides an electrical output of not less than four volts and one hundred and fifty milliamperes of current.

11. The combination of claim 2, wherein:
    said crankcase has an open void having a depth of approximately ten millimeters; and
    said annulus has a land portion, having a length of approximately ten millimeters, which substantially fills said void.

12. For use in combination with an engine for a model vehicle, such as a model airplane or the like, a direct-current generator, comprising:
    a housing;
    an annulus coupled to said housing; and
    a three-pole armature rotatably journalled in said annulus; wherein
    each of said poles has not less than six hundred turns of magnetic wire;
    said armature has a maximum diameter of not more than seventeen millimeters; and
    said poles each have a length of not more than twelve millimeters.

13. A direct-current generator, according to claim 12, wherein:
    said magnetic wire is of forty gauge.

14. A direct-current generator, according to claim 12, wherein:
    said magnetic wire is of thirty-six gauge.

15. A direct-current generator, according to claim 12, wherein:
    each of said poles has not less than one thousand turns of magnetic wire.

* * * * *